Oct. 13, 1959          A. L. BENNETT                2,908,386
                      TESTING APPARATUS

Filed June 27, 1952                             3 Sheets-Sheet 1

INVENTOR.
A. L. Bennett
BY
E. F. Kane
Atty.

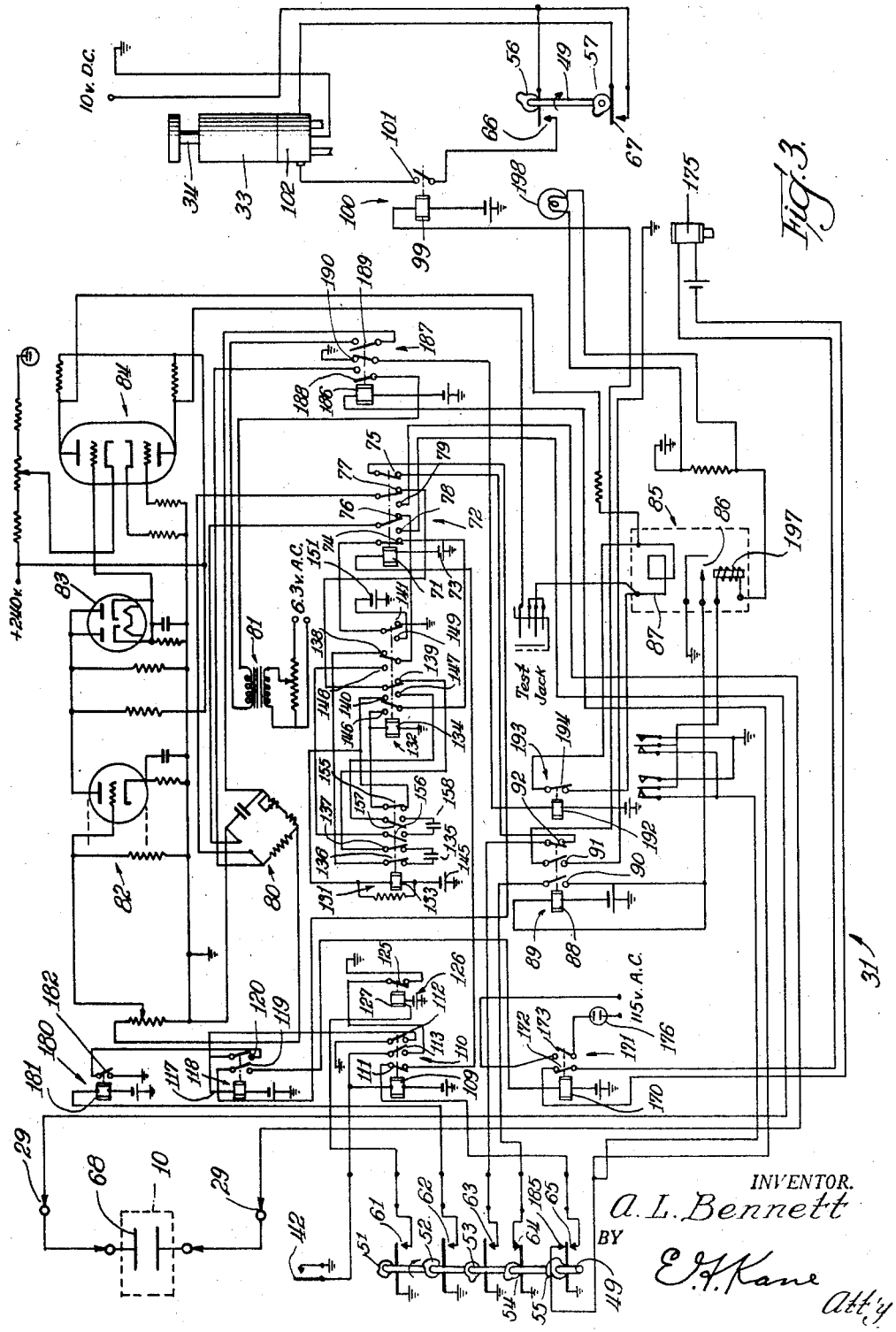

United States Patent Office 2,908,386
Patented Oct. 13, 1959

2,908,386

TESTING APPARATUS

Arthur L. Bennett, Indianapolis, Ind., assignor to Western Electric Company, Incorporated, New York, N.Y., a corporation of New York Application June 27, 1952, Serial No. 296,047

10 Claims. (Cl. 209—72)

This invention relates to testing apparatus, and more particularly to apparatus for testing electrical networks.

In apparatus for applying multiple tests to articles, such as, for example, networks including capacitors, inductances and the like, there often is provided a plurality of test stations each provided with a testing circuit for testing one characteristic of the article to be tested, and ejectors associated with each testing station for ejecting articles at the stations which do not some up to requirements. Usually there is provided automatically operable conveyor means for conveying the articles from one station to another. As the testing circuits at the several stations are used, they sometimes come out of adjustment, and, in the past, it has been necessary to stop the machine and test all the testing circuits periodically to see whether they were in proper adjustment.

An object of the invention is to provide new and improved testing apparatus.

Another object of the invention is to provide new and improved apparatus for testing electrical networks.

A further object of the invention is to provide apparatus for applying several tests to articles and for automatically checking testing circuits utilized in the tests.

An apparatus illustrating certain features of the invention may include a plurality of testing stations each provided with an individual testing circuit, along which stations an article is advanced from one station to another. Defective articles are ejected at each station in response to the testing circuit associated with that station. Each time an article is ejected at one station, the test circuit at a subsequent station is actuated to check the circuit at the second station to determine whether it is within allowable limits or not. If the test circuit at the later station fails, the conveyor is stopped until the condition is corrected.

Figure 1:
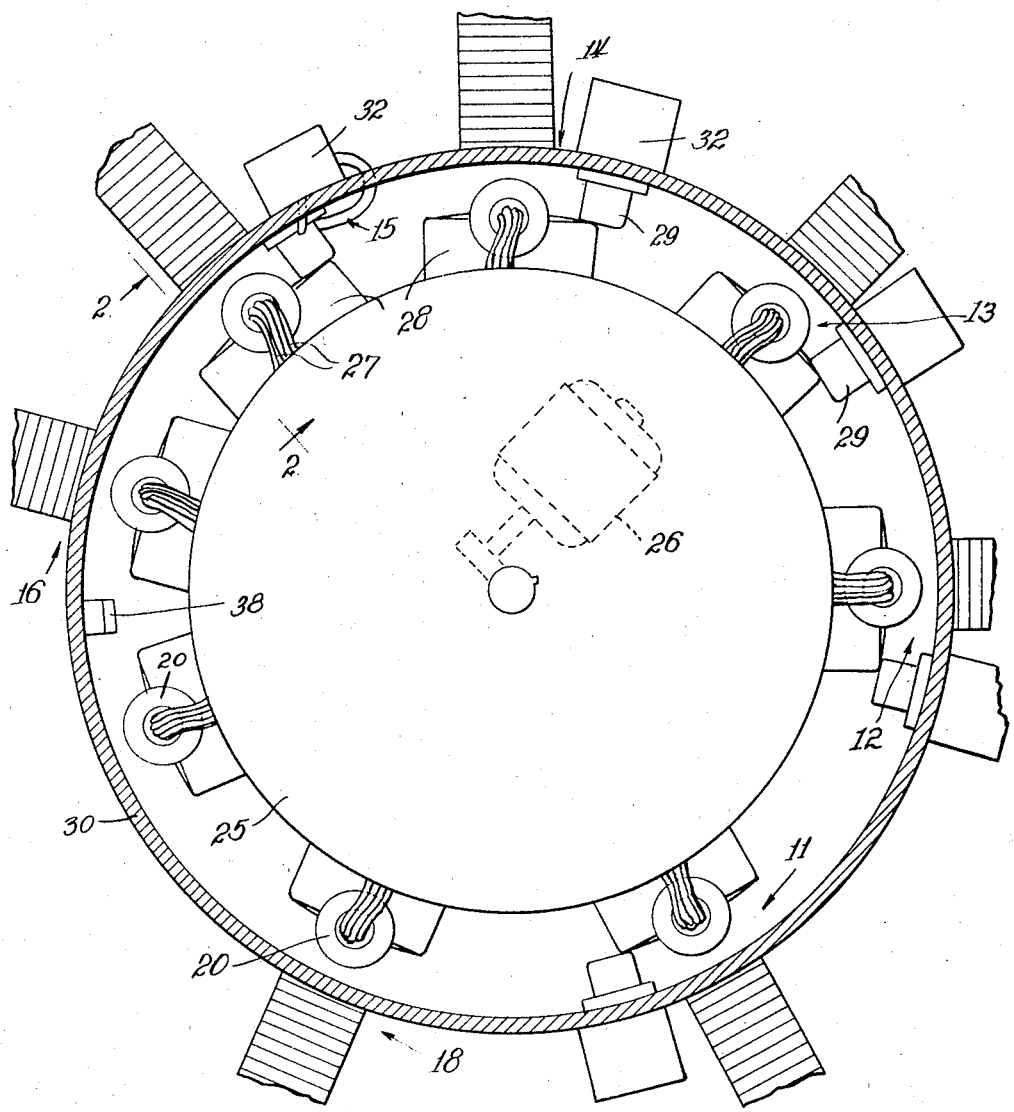
Figure 2:
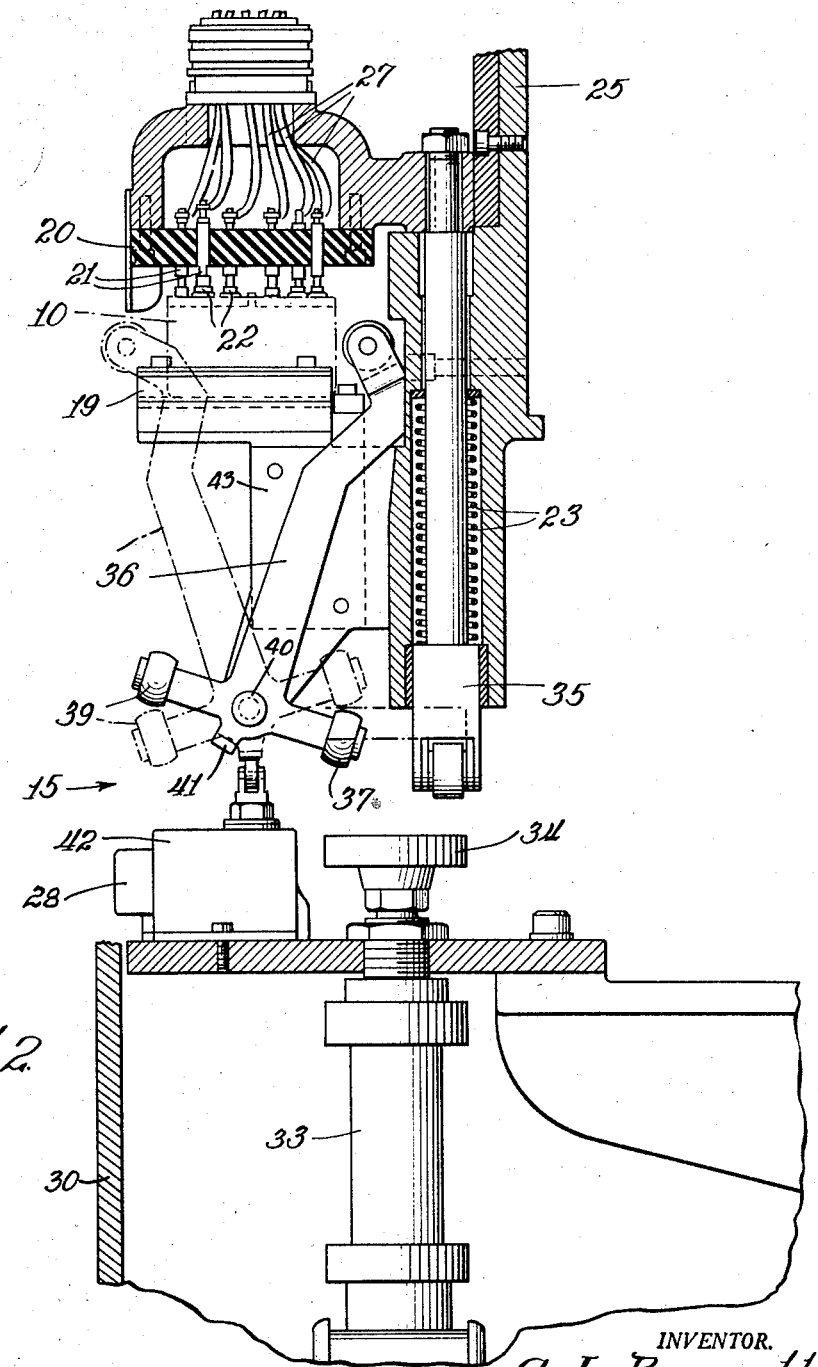

A complete understanding of the invention may be obtained from the following detailed description of an apparatus forming a specific embodiment thereof, when read in conjunction with the appended drawings, in which Fig. 1 is a horizontal section of an apparatus forming one embodiment of the invention;

Fig. 2 is an enlarged, fragmentary, vertical section taken along line 2—2 of Fig. 1, and Fig. 3 is a diagrammatic view of a test circuit forming a portion of the apparatus shown in Fig. 1.

Referring now in detail to the drawings, there is shown therein an apparatus for applying tests to networks 10 (Figs. 1 and 2) at testing stations 11, 12, 13, 14 and 15, and discharging accepted networks at an unloading station 16. The networks are loaded at a loading station 18 between split guide supports or holders 19 (Fig. 2) and jaws 20 carrying electrodes 21 designed to engage terminals 22 of the networks 10. The jaws 20 are normally urged by springs 23 downwardly, as viewed in Fig. 2, to clamping positions on the networks, and are pulled upwardly away from the holders 19 at the loading station 18 so that the networks may be inserted therebetween. The holders 19 and the jaws 20 opposed thereto are moved continuously by a turret 25 driven by a motor 26 (Fig. 1) to move the holders and jaws sequentially past the stations 11, 12, 13, 14, 15, 16 and 18. The electrodes 21 (Fig. 2) are connected by conductors 27 and brushes 28 to commutator segments 29, which are mounted on a stationary housing 30 below the paths of the jaws 20. The electrodes 21 connect the several elements of the networks to test circuits, illustrated by a test circuit 31 shown in Fig. 3, which is designated to be used when the articles are at the testing station 15. The test circuits are mounted in housings 32 fixed to the housing 30.

At each of the stations 11, 12, 13, 14, 15 and 16 (Fig. 1), there is provided a stationary cylinder 33 (Fig. 2) for actuating a piston 34 to engage a cam follower 35 to raise the jaws 20 away from the holders 19 to release the articles and pivot an ejecting lever 36 through a follower 37 so as to eject or push a network 10 along and from the holder 19 at the station whenever the network fails to pass the test to which it is subjected at the station. The lever 36 is mounted pivotally on a pin 40 carried by a bracket 43 fixed to the turret 25. After the cylinder has been actuated to move the piston upwardly, it retracts the piston which leaves the ejecting lever in its overbalanced ejecting position. A cam track 38 (Fig. 1) located between the unloading station 16 and the loading station 18 is engaged by a follower 39 (Fig. 2) as the follower 39 is moved therepast to return each lever 36 to its non-ejecting position.

The ejecting lever 36 is provided with an arm 41 (Fig. 2), which, when the lever 36 is in its broken-line or ejecting position, is in a position to actuate a microswitch 42 at the approach side of the station 15 as the holder 19 associated with that arm 41 approaches the testing station 15 just before the test is applied at the station 15. When the lever 36 is in its non-ejecting position, as shown in full-lines in Fig. 2, as is the case when the network carried thereby has passed all the tests at the stations 11, 12, 13 and 14, the arm 41 is in a retracted or non-actuating position, and does not engage the microswitch 42 as the holder is moved to and past the station 15.

There is provided a shaft 49 (Fig. 3) driven in synchronism with the drive of the turret 25 for turning cams 51, 52, 53, 54, 55, 56 and 57, which sequentially actuate switches 61, 62, 63, 64, 65, 66 and 67, respectively, as the turret moves each holder to and through the testing station 15. The circuit 31 at station 15 serves to test the capacity of a condenser 68 of the network 10 connected to the electrodes 21 of the jaw 20. As the condenser 68 is connected to the test circuit 31 by the brush 28 and the commutator segment 29 at the station 15, the switch 65 is closed by the cam 55. This energizes a relay winding 71 of a relay 72 by a battery 73 to open contacts 74, 75, 76 and 77, and close contacts 78 and 79. The contacts 78 and 79 connect the condenser 68 in one arm of a bridge 80 supplied with alternating current from a transformer 81, and the output of the bridge, depending on the value of the condenser 68, is amplified by an A.C. amplifier 82. The output of the amplifier 82 is rectified by a rectifier tube 83, and is supplied to a D.C. amplifier 84. The output of the D.C. amplifier 84 is applied to a coil 87 of a sensitive, meter-type relay 85, and, if the output is too high, indicating that the condenser 68 is outside of allowable limits of its capacitance, the relay 85 is actuated to close contacts 86 to energize a relay winding 88 of a relay 89 to close contacts 90 and 91 and open contacts 92. Test jack switches are placed in series with the meter relay 85 and the amplifier 84, and must be closed to connect the relay to the amplifier. Closing of contacts 91 energizes a relay winding 99 of a relay 100 to make contacts 101. Subsequently, the switch 66 is closed by the cam 56 to actuate a solenoid controlled valve 102 to cause the cylinder 33 to be actuated to push the network off the holder 19. The cam 57 later actuates reset contacts 67 to actuate the valve to return the piston 34 to its lowermost position.

If the condenser 68 has a capacitance within the allowable range, the relay 85 is not actuated so that the relays 89 and 100 are not actuated. Hence, the contact 101 of the relay 100 remains open when the cam 56 closes the switch 66, and the cylinder 33 is not actuated to raise the piston 34. The holder 19 then is moved to the unloading station 16, and the network carried thereby is discharged there by a fixed actuator (not shown).

If one of the holders 19, which is empty because of not having been loaded or of a rejection of its network at one of the stations 11, 12, 13 and 14, approaches the station 15, the lever 36 is in its ejecting position and the arm 41 (Fig. 2) of the lever 36 closes the microswitch 42 before the cam 55 connects the contacts 65 to ground. This energizes a relay winding 109 of a relay 110 to open contacts 111 and close contacts 112 and 113. Opening of contacts 111 prevents energization of the relay winding 71 when the cam 55 connects the contact 65 to ground. Closing of contacts 112 actuates a relay winding 117 of a relay 118 to close contacts 119 and 120. Closing of contacts 119 closes a circuit to a relay winding 170 of a relay 171 except for the switch 63, which is open at this time, through the contacts 75 of the relay 72 and the contacts 92 of the relay 89. Closing of contacts 113 connects contacts 125 of a relay 126 to the winding 109 to lock in the relay 110 until the cam 51 closes the switch 61 to energize a winding 127 of the relay 126 to open the contacts 125, which latter action occurs after the bridge 80 has been tested by the empty holder 19.

The contact 74 of the relay 72 and relays 131 and 132 are so connected as to form a flip-flop circuit such that relay windings 133 and 134 of the relays 131 and 132, respectively, are energized alternately with one another. That is, during one period while the contact 74 is closed, the relay winding 133 is energized to connect a condenser 135, a standard, of just less than acceptable capacitance to the bridge 80 through normally open contacts 136 and 137 of the relay 131, contacts 138 and 139 of the relay 132 and contacts 76 and 77 of the relay 72, and the relay winding 134 is deenergized because contacts 140 and 141 of the relay 132 and the contacts 74 shunt the relay winding 134 to ground through a lower resistance path than that of the relay winding 134. When the contacts 74 next are opened to break the shunt of the winding 134 by energization of the relay 72, occurring whenever the next loaded holder arrives at the station 15 and the cam 55 closes the switch 65, the current from a battery 145 passes through the winding 134, through normally open contacts 155 of the relay 131, as well as the winding 133, and the winding 134 is energized to break contacts 138, 139, 140 and 141 and make contacts 146, 147, 148 and 149. Then, when the cam 55 breaks the connection of the switch 65 to ground, the relay 72 is dropped out and the contacts 74 reclose to connect the winding 134 to a battery 151 through the contact 149. The battery 151 now opposed flow of current from the battery 145 through the winding 133, and this causes sufficiently less current to flow through the winding 133 from the battery 145 to deenergize the winding 133. Contacts 136, 137 and 155 of the relay 131 then open, and contacts 156 and 157 of the relay 131 close to connect a condenser 158, or standard, having a capacitance just greater than the maximum allowable capacitance to the contacts 76 and 77 of the relay 72 through the contacts 147 and 148 of the relay 132. On the passage of the next holder 19 carrying a network 10 through the station 15, the contacts 74 of the relay 72 is opened and closed to bring the relay 131 to an actuated condition and the relay 132 to a non-actuated condition to complete the cycle.

Assuming that an empty holder 19 comes to the station 15 and trips the microswitch 42, one of the two condensers 135 and 158, which of the condensers depending on the setting of the just described flip flop circuit, is connected to the bridge 80. If the bridge is in proper adjustment, that condenser 135 or 158 connected, being just outside the allowable range, actuates the relay 85 to actuate relay 89 which actuates the reject relay 100. If the bridge 80 or the amplifiers 82 and 84 are in improper adjustment so as to make the connected one of the condensers 135 and 158 fail to actuate the relay 85, the relay 89 is not actuated to open contacts 92, and when the cam 53 closes the switch 63 at the end of the test period, the relay winding 170 of a relay 171 is actuated to open contacts 172 and close contacts 173. Opening contacts 172 breaks a circuit to a motor control solenoid 175 which drops out and deenergizes the motor 26 to stop the machine. Closing contacts 173 makes the circuit to a neon lamp 176 to indicate that the testing circuit 31 is improper. Thus, either the testing circuit 31 is checked either for accepting a too low a capacitance condenser or a too high a capacitance condenser each time an empty holder 19 arrives at the station 15. The testing sets 32 at the stations 11, 12, 13 and 14 operate on an empty holder 19 to move the lever 36 to its reject position. Hence, an operator may occasionally deliberately not load one holder 19, load the next succeeding holder and not load the secondly succeeding holder to check the circuit for improper adjustment at both ends of the allowable range.

A relay 180 is actuated by the cam 52 closing the switch 62 each cycle just after the microswitch 42 would be closed by an empty holder 19 and before the microswitch reopens. A winding 181 of the relay 180 closes contacts 182 to lock in the relay 118 so that reopening of the microswitch 42 does not drop out the relay 110. The cam 52 keeps the switch 62 closed until the checking of the test circuit 31 by the empty holder 19 is completed, and then opens the switch 62 to drop out the relays 180 and 118. The cam 51 momentarily closes the switch 61 at the end of the checking cycle to momentarily energize the relay 126, which then breaks the holding circuit to the relay 110 to drop it out.

The cam 55 closes contacts 65 and breaks contacts 185 to start each testing operation as distinguished from a checking operation. Breaking contacts 185 breaks the circuit to a relay winding 186 of a relay 187. The relay 187 drops out, contacts 188 and 189 thereof closing and contacts 190 opening. Closing the contacts 188 and 189 connects the bridge 80 to the transformer 81, and opening the contacts 190 breaks the circuit to a relay winding 192 of a relay 193 to open contacts 194 of the relay 193, thereby breaking a shunt of the actuating winding 87 of the relay 85 during the testing period. During the testing period, the period in which the cam 55 keeps the contacts 65 closed, a retaining relay winding 197 of the relay 85 is energized. The winding 197 is not strong enough to close the contacts 86 by itself but keeps the contacts 86 closed after the winding 87 closes them until the cam 55 permits the contacts 65 to reopen. While the contacts 65 are closed a signal lamp 198 is energized.

Operation

The motor 26 runs to turn the turret 25 continuously in a counter-clockwise direction, as viewed in Fig. 1, and the networks 10 are loaded at the station 18 and are advanced past the test stations 11, 12, 13, 14 and 15 to the unloading station 16 if they successfully fulfill all the tests. If a network on one of the holders 19 has passed the tests at the stations 11, 12, 13 and 14, it is advanced to the station 15 and the microswitch 42 is not closed. The shaft 49 driven by the motor 26 makes one complete revolution as each holder is advanced to, through and from the station 15, and the cam 55 breaks contacts 185 and makes contacts 65 as the contactors 28 of the holder engage the commutator segments 29 (Fig. 1) at the station 15. Breaking of contacts 185 drops out the relay 187 (Fig. 3) to connect the bridge 80 to power and drop out the relay 193, which had been short circuiting the coil 87, and also causes the relay winding 197 to be energized. Making the contacts 65 also actuates the relay 72 to connect the condenser 68 in one arm of the bridge 80.

If the condenser 68 is within allowable limits, the bridge 80 is not sufficiently unbalanced to energize the actuating winding 87 of the relay 85. If the condenser 68 is either too high or too low in capacitance, the bridge 80 actuates the winding 87 to close contacts 86, which then are held closed by the winding 197, and the relay 89 is actuated to break contacts 92 in the energizing circuit of the relay 171 and make contacts 90 and 91. Making contacts 91 actuates the relay 100, which closes the contacts 101 and holds them closed until the cam 56 has closed the contacts 66 to actuate the rejecting cylinder 33 to raise the piston 34 to eject the network. Thereafter, the cam 55 breaks the contacts 65 and opens the contacts 185 to reset the circuit, and the cam 57 closes the contacts 67 to lower the piston 34 to its non-rejecting position. The cam 54 opens the switch 64 to reset the relays 89 and 100.

Whenever an empty holder 19 comes to the station 15, the microswitch 42 is closed to actuate the relay 110 before the contacts 65 are made, and the cam 52 actuates the relay 180 to set up a holding circuit for the relay 118 which is actuated by the contacts 112 of the relay 110. The contacts 119 set up a circuit to the relay 171, which is actuated by making of the contacts 63 by the cam 53 if the relay 85 has not been actuated by the one of the just outside allowable range condensers 135 and 158. That is, non-actuation of the relay 85 by the connected one of the condensers 135 and 158 fails to actuate the relay 89 to break contacts 92, and the subsequent making of the contacts 63 actuates the relay 171 through the contacts 119, 75, 92 and 63 to break contacts 172 to deenergize the solenoid 175 to stop the motor 26. If the testing circuit is in proper adjustment when an empty holder comes to the station 15, the relay 89 is actuated to prevent actuation of the relay 171. If the bridge 85 is in proper adjustment, the one of the condensers 135 and 158 connected therein, actuates the relay 85 to actuate the rejecting relay 89 to break contacts 92 before the contacts 63 are made so that the relay 170 is not actuated. In this way, not only the bridge 80 and the amplifiers 82 and 83 are checked, but the relays 85 and 89 also are checked by the empty carriers.

The above-described apparatus tests the networks, and automatically checks the circuit 31 for adjustment whenever an empty holder 19 comes to the station 15. Hence, the apparatus prevents passing large number of unacceptable condensers.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A testing apparatus, which comprises a movable carrier for supporting an article to be tested, means for advancing the carrier along a predetermined path, testing means connectible to the article and located at a given point along the path for testing the article on the carrier, a standard, and means responsive at said given point to elements on the carrier when said carrier is empty for actuating the testing means to connect the standard to the testing means in the absence of the article.

2. A testing apparatus, which comprises means for holding an article to be tested, a plurality of test sets, means for connecting the article sequentially to the test sets, means operable to release from the holding means and eject the article at the end of its connection to each test set if the article fails to pass that test, a standard, means for connecting the standard in lieu of the article to one of the test sets operable after the first-operated test set, and means responsive to operation of the ejecting means at the end of the operation of the first-operated test set to actuate the last-mentioned connecting means.

3. A testing apparatus, which comprises a plurality of test sets arranged one after another for testing separate characteristics of articles to be tested, means for conveying the articles one after another past the test sets, means for connecting each article to each test set as the article is advanced thereto by the conveying means, an ejector operably connected to each test set operable to eject articles failing to pass one of the tests, said ejectors when operable moving from an inoperative position to an ejecting position, a standard, means for connecting the standard to one of the test sets in lieu of the article, and means operable by an ejector being in the ejecting position for actuating the last-mentioned connecting means.

4. A testing apparatus, which comprises a testing circuit, a carrier movable past the circuit for carrying an article into testing engagement with the circuit and having an ejector thereon, means for driving the carrier, a standard, means for connecting the standard to the testing circuit in place of the article, means operable by the ejector when the carrier is empty for actuating the connecting means, and means operable by the failure of the testing circuit when connected to the standard for stopping the driving means.

5. A testing apparatus, which comprises a testing circuit, means movable past the circuit for carrying an article into testing engagement with the circuit, an element mounted on the carrying means selectively positioned in accordance with the presence of an article, a motor for driving the carrying means, a standard, means for connecting the standard to the testing circuit in place of the article, means operable by said element on the carrying means when the carrying means is empty for actuating the connecting means, and means operable by the failure of the testing circuit when checked with the inserted standard for stopping the motor.

6. A testing apparatus, which comprises a turret, a plurality of holders on the turret, means for driving the turret, means for clamping networks to the holders, contactors carried by the clamping means for engaging terminals of the networks, an ejector associated with each holder, an electrical test set, contacting means for connecting the contactors to the test set as the holder is advanced to the contacting means, means operable by the test set and located near the contacting means for actuating one of the ejectors and clamping means to release and eject a network from the holder at the contacting means when the network fails to pass the test of said test set, a second electrical test set, second contacting means located beyond the first contacting means for connecting the contactors to the second test set, means operable by the second test set located near the second contacting means operable to actuate one of the ejectors and clamping means to release and eject a bad network being tested by the second test set, said second test set being designed to accept networks having a predetermined characteristic, a standard having a value characteristic just different from said predetermined characteristic, means operable by an ejector when the holder is empty for connecting the standard to the second test set in the same manner as the network would have been connected, and means operable by portions of said means operable by the second test set and by failure of the second test set to actuate the second ejector-actuating means when connected to the standard for stopping the driving means.

7. A testing apparatus, which comprises a conveyor, a plurality of holders on the conveyor, an electric motor for driving the conveyor, means associated with each holder for clamping networks to the holders, a plurality of sets of contactors carried by each clamping means for engaging terminals of the networks, an ejector associated with each holder for ejecting articles from the holders, an electrical test set, contacting means for connecting one set of contactors to the test set as each holder advances to the contacting means, means operable by the test set and located near the contacting means operable to actuate one of the ejectors and clamping means to release and eject a network from the holder at the contacting means when the network fails to pass the test of the test set, said one of the ejectors when actuated moving from an inoperative position to an ejecting position, a second electrical test set, second contacting means located beyond the first contacting means for connecting the contactors to the second test set, means operable by the second test set located near the second contacting means operable to actuate one of the ejectors and clamping means if a network connected to the second test fails to pass the test of the second test set, said second test set being designed to accept networks within a predetermined range, a standard having a value just below said range, a second standard having a value just above said range, a flip-flop circuit operable to alternately make available the first standard and the second standard, means operable by an ejector in the ejecting position when the holder is empty for connecting the available standard to the second test set in the same manner in which the network would have been connected, and means operable by portions of said means operable by the second test set and by failure of the second test set to actuate the second ejector-actuating means when connected to one of the standards for stopping the motor.

8. A testing apparatus, which comprises a movable carrier for supporting an article to be tested, means for advancing the carrier along a predetermined path, testing means located at a given point along the path for engaging and testing the article on the carrier, a second testing means located farther along said path for testing the article on the carrier, means operable by the first testing means to eject the article when it fails to pass the test of the first testing means, a standard for checking the second testing means, and means responsive to the ejecting means for actuating the second testing means to connect the standard to the testing means in the absence of the article.

9. In an apparatus for sequentially subjecting electrical networks to a series of successive tests, a plurality of test stations each having a first electrical test circuit for ascertaining a predetermined characteristic of each network, a carrier having a plurality of network supports for successively advancing networks through said test stations, an ejector mechanism mounted on and associated with each network support for ejecting a network, means at each station for contacting and connecting the associated electrical test circuit to each network advanced thereto, means operated by the contacting means engaging a network for initiating operation of the associated electrical test circuit, means operated by said test circuit when a deficient network is connected thereto for operating said ejector mechanism, a second test circuit associated with each first test circuit for testing said associated first circuit, and means actuated by an operated ejector mechanism being advanced into the next successive station for operatively connecting the second test circuit at that station in circuit with the associated first circuit at that station.

10. A testing apparatus comprising a movable turret, a plurality of holding devices spaced along said turret for holding articles to be tested, a plurality of stations having testing circuits dispersed around the turret, means for intermittently moving the turret for sequentially positioning the holding devices and articles held thereby at the stations, means for connecting the articles to the testing circuits upon the positioning of the holding device at the stations, an ejector carried by each holding device, means at each station operated by the testing circuit when a deficient article is connected thereto for actuating the holding device and ejector to release and expel deficient articles detected by the testing circuit, said ejector being actuated from an inoperative position to an ejecting position, a standard measurement test circuit associated with each station for testing the first-mentioned testing circuit, means operable by the ejector being in the ejecting position upon movement into the next successive station for connecting the standard measurement test circuit to said first-mentioned testing circuit, and means operated by a deficient first-mentioned testing circuit being connected to the standard measurement test circuit for stopping the movement of the turret.

References Cited in the file of this patent

UNITED STATES PATENTS

| | | |
|---|---|---|
| 2,016,455 | Purdy | Oct. 8, 1935 |
| 2,362,691 | Gaiser | Nov. 14, 1944 |
| 2,567,741 | Smith | Sept. 11, 1951 |
| 2,591,047 | Burge et al. | Apr. 1, 1952 |